(12) United States Patent
Potter et al.

(10) Patent No.: US 12,490,713 B2
(45) Date of Patent: Dec. 9, 2025

(54) POUCH FOR DISPENSING SQUEEZABLE ANIMAL TREAT AND METHODS

(71) Applicant: Spectrum Brands, Inc., Middleton, WI (US)

(72) Inventors: Tiffany Dawn Potter, Middleton, WI (US); Gregory Van Eyk, Middleton, WI (US); Stephanie Hullverson, Middleton, WI (US); Todd Palmer, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 207 days.

(21) Appl. No.: 18/003,951

(22) PCT Filed: Jun. 28, 2021

(86) PCT No.: PCT/US2021/039375
§ 371 (c)(1),
(2) Date: Dec. 30, 2022

(87) PCT Pub. No.: WO2022/005971
PCT Pub. Date: Jan. 6, 2022

(65) Prior Publication Data
US 2023/0263132 A1 Aug. 24, 2023

Related U.S. Application Data

(60) Provisional application No. 63/046,297, filed on Jun. 30, 2020.

(51) Int. Cl.
*A01K 5/01* (2006.01)
*A47G 21/00* (2006.01)
*B65D 51/24* (2006.01)

(52) U.S. Cl.
CPC .......... *A01K 5/0121* (2013.01); *A47G 21/004* (2013.01); *B65D 51/246* (2013.01)

(58) Field of Classification Search
CPC .................................................. B65D 75/5855
(Continued)

(56) References Cited

U.S. PATENT DOCUMENTS 2,252,119 A   8/1941  Edmonds
3,116,152 A * 12/1963 Smith .................... B65D 35/08
                                                    426/115
(Continued)

FOREIGN PATENT DOCUMENTS

CA    2333405 C    10/2006
CA    3016125 A1   10/2017
(Continued)

OTHER PUBLICATIONS

Extended European Search Report for European Application No. 21832041.4 dated May 29, 2024, 11 pages.
(Continued)

*Primary Examiner* — Paul R Durand
*Assistant Examiner* — Michael J. Melaragno
(74) *Attorney, Agent, or Firm* — Merchant & Gould P.C.

(57) ABSTRACT

A pouch for dispensing a squeezable animal treat includes a flexible, squeezable wall with an interior volume and a spoon integral and non-removably secured to the body. The spoon has a storage configuration and a dispensing configuration.

14 Claims, 5 Drawing Sheets

(58) Field of Classification Search
USPC .................................. 222/106, 92, 93, 494
See application file for complete search history.

(56) References Cited

U.S. PATENT DOCUMENTS

| | | | |
|---|---|---|---|
| 3,272,324 A * | 9/1966 | Schneider | B65D 81/3266 206/221 |
| 3,383,018 A * | 5/1968 | Grimsley | A61J 7/0053 215/393 |
| 3,670,730 A | 6/1972 | White | |
| 3,981,304 A * | 9/1976 | Szpur | A61M 35/006 401/133 |
| 3,993,223 A | 11/1976 | Welker, III et al. | |
| 4,830,222 A | 5/1989 | Read | |
| 4,888,188 A * | 12/1989 | Castner, Sr. | B65D 81/3484 222/146.2 |
| 5,038,974 A * | 8/1991 | DaCosta | B65D 83/0055 222/106 |
| 5,305,928 A * | 4/1994 | Verdaguer | B65D 51/246 30/125 |
| 5,491,895 A * | 2/1996 | Lee | A61J 7/0023 30/141 |
| 5,636,592 A | 6/1997 | Wechsler | |
| 5,934,048 A | 8/1999 | Bouressa | |
| 6,102,254 A * | 8/2000 | Ross | A61P 31/04 141/114 |
| 6,264,074 B1 * | 7/2001 | Emilsson | A61J 7/0023 30/141 |
| 6,279,233 B1 * | 8/2001 | Cameron | A61J 7/0046 30/125 |
| 6,776,307 B1 * | 8/2004 | Hagihara | B65D 75/5883 222/107 |
| 6,851,574 B1 | 2/2005 | Traynor | |
| 7,210,600 B1 * | 5/2007 | Delio, Jr. | A47G 21/04 222/93 |
| 7,374,046 B1 * | 5/2008 | O'Brien | A45C 11/20 206/541 |
| 7,487,894 B2 | 2/2009 | Zahn et al. | |
| 7,722,254 B2 | 5/2010 | Murray | |
| 7,975,386 B1 * | 7/2011 | Halvorson | A47G 21/004 222/93 |
| 8,500,707 B2 * | 8/2013 | Murray | A61F 5/445 383/88 |
| 8,528,736 B2 | 9/2013 | Teys et al. | |
| 8,727,244 B2 | 5/2014 | Bernstein et al. | |
| 8,827,114 B2 * | 9/2014 | Scott | B65D 35/32 222/113 |
| 8,950,635 B2 * | 2/2015 | Loya | A61J 7/0023 222/206 |
| D762,015 S | 7/2016 | Pietrocarlo et al. | |
| 9,480,625 B2 | 11/2016 | McBean et al. | |
| 9,635,965 B2 | 5/2017 | Murray | |
| 9,713,576 B2 | 7/2017 | McBean et al. | |
| 9,855,194 B1 | 1/2018 | Walter, Jr. | |
| 9,894,879 B2 | 2/2018 | Sanderson | |
| 10,589,075 B2 | 3/2020 | Wills et al. | |
| 11,198,544 B2 * | 12/2021 | Loya | B65D 47/0838 |
| 2003/0002754 A1 | 1/2003 | Kim et al. | |
| 2007/0045341 A1 * | 3/2007 | Bauer | B65D 75/30 222/541.9 |
| 2008/0072432 A1 * | 3/2008 | Teys | A47J 43/281 206/572 |
| 2009/0241277 A1 * | 10/2009 | Lam | B08B 1/00 15/104.94 |
| 2010/0116772 A1 | 5/2010 | Teys | |
| 2010/0147885 A1 | 6/2010 | Braxton et al. | |
| 2010/0307384 A1 * | 12/2010 | Urushidani | B65D 75/008 108/42 |
| 2011/0024462 A1 * | 2/2011 | Teys | G01F 19/002 222/192 |
| 2011/0186597 A1 * | 8/2011 | Schaefer | B65D 35/00 222/106 |
| 2013/0026170 A1 * | 1/2013 | Zerfas | B65D 75/44 493/264 |
| 2013/0037563 A1 * | 2/2013 | Steele | B65D 47/10 222/530 |
| 2013/0047446 A1 * | 2/2013 | Leffler | A47G 21/004 30/326 |
| 2013/0113151 A1 * | 5/2013 | Dufaux | B02C 19/0056 269/287 |
| 2013/0306647 A1 | 11/2013 | Sachdev | |
| 2014/0353182 A1 * | 12/2014 | Murray | B65D 51/246 206/553 |
| 2015/0131926 A1 * | 5/2015 | Lux | B65D 75/5855 383/89 |
| 2015/0239624 A1 | 8/2015 | Chelemedos | |
| 2015/0296743 A1 | 10/2015 | Pietrocarlo et al. | |
| 2016/0075483 A1 * | 3/2016 | Braxton | A61J 7/0023 220/705 |
| 2016/0120346 A1 | 5/2016 | Callahan et al. | |
| 2017/0225860 A1 | 8/2017 | van den Berg et al. | |
| 2017/0291740 A1 | 10/2017 | Genaw, Jr. et al. | |
| 2018/0028411 A1 | 2/2018 | Venezia | |
| 2020/0122891 A1 | 4/2020 | Merritt | |

FOREIGN PATENT DOCUMENTS

| | | | |
|---|---|---|---|
| CN | 103654184 A | 3/2014 | |
| CN | 210042966 U | 2/2020 | |
| DE | 3503167 A1 | 8/1986 | |
| EP | 3310678 B1 | 4/2020 | |
| GB | 2382020 A | 5/2003 | |
| GB | 2401025 A | 11/2004 | |
| GB | 2401025 B | 9/2006 | |
| GB | 2502793 A | 12/2013 | |
| JP | 63-129455 U | 8/1988 | |
| WO | 03/010068 A3 | 2/2003 | |
| WO | 2004/089275 A1 | 10/2004 | |
| WO | 2005/063102 A1 | 7/2005 | |
| WO | 212/054878 A3 | 4/2012 | |
| WO | WO-2021069931 A1 * | 4/2021 | A47G 21/004 |
| WO | WO-2022005971 A1 * | 1/2022 | A01K 5/0121 |

OTHER PUBLICATIONS

International Search Report and Written Opinion for PCT/US2021/039375 (Oct. 19, 2021).

* cited by examiner

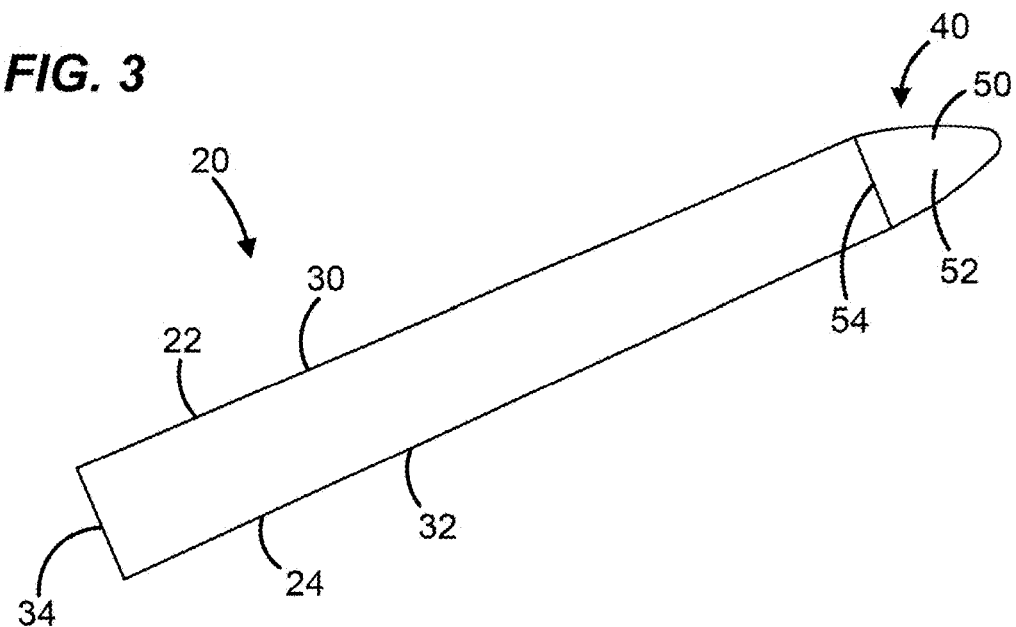
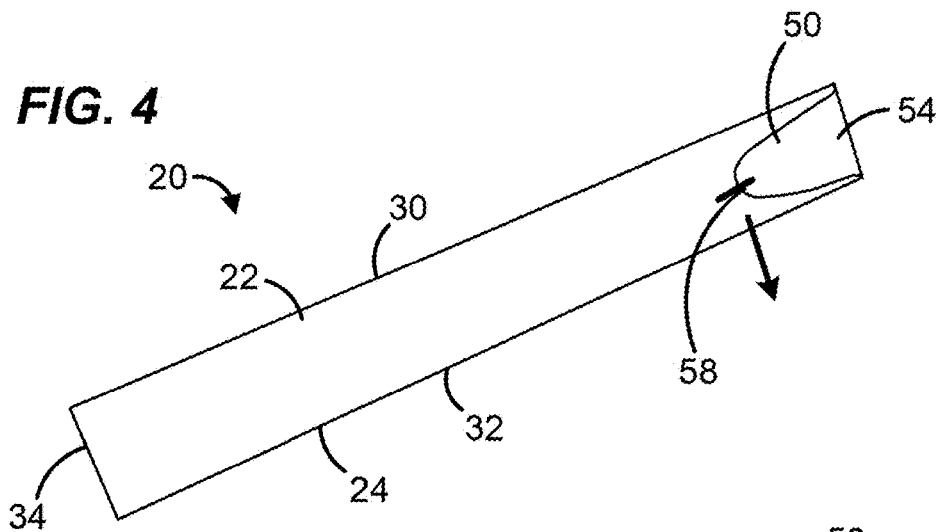
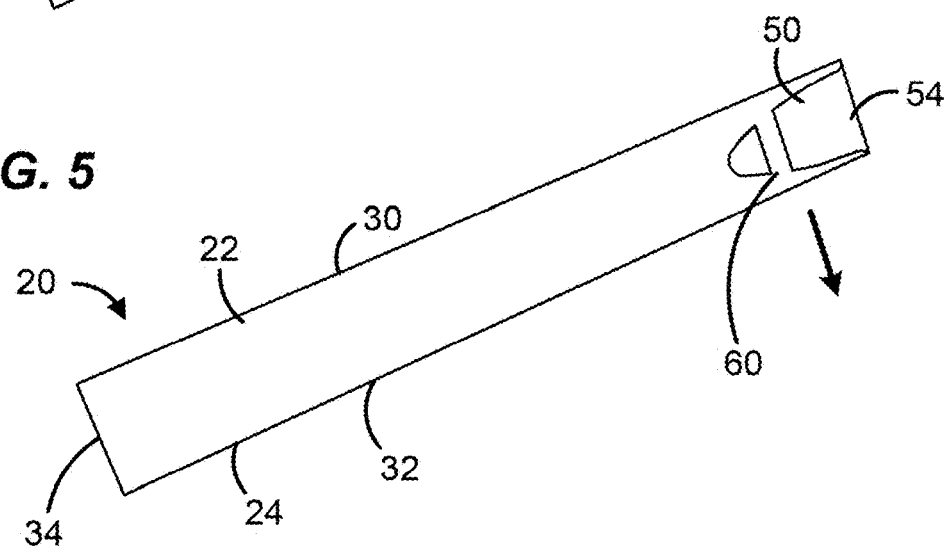

POUCH FOR DISPENSING SQUEEZABLE ANIMAL TREAT AND METHODS

CROSS-REFERENCE TO RELATED APPLICATION

This application is a National Stage Application for PCT/US2021/039375, filed Jun. 28, 2021, which claims the benefit of priority to U.S. Patent Application Ser. No. 63/046,297, filed on Jun. 30, 2020, which applications are incorporated herein by reference. To the extent appropriate, a claim of priority is made to each of the above disclosed applications.

TECHNICAL FIELD

This disclosure relates to a squeezable pouch for convenient dispensing and serving of an animal treat. In particular, this disclosure relates to a squeezable pouch having an integral spoon and methods of use.

BACKGROUND

Many pet owners like to give their pets special treats that are highly appetizing for the animal. While some animals are easy to please, other animals are more finicky. In particular, cats can be especially finicky.

One type of pet treat in the prior art is a non-solid food, such as a puree. While purees are popular with many cats, a common complaint among the pet owners is that it is a messy product to give to their animal. The packaging does not provide for easy dispensing or feeding, and the pet owner will often get the food on their hands.

Improvements are desirable.

SUMMARY

In general, a pouch for dispensing a squeezable animal treat is provided that addresses the problems in the prior art.

In one aspect, a pouch is provided including a pouch body with a flexible, squeezable surrounding wall defining an interior volume. The body includes a mouth in communication with the interior volume. A spoon is integral and non-removably secured to the body. The spoon has a storage configuration and a dispensing configuration. The spoon is adjacent to the mouth in the body.

In many embodiments, the pouch has an interior volume that is sized to hold no more than 8 ounces of material, and in some instances, 1-6 ounces of material, and in some examples, 1-4 ounces of material.

In many embodiments, the pouch further includes a non-solid foodstuff suitable for animal consumption in an interior volume. The foodstuff can comprise any one of a puree, mash, mush, paste, liquid, sauce, broth, chowder, stew, gravy, juice or bisque.

The non-solid food stuff can be a variety of flavors including seafood such as tuna or salmon; poultry such as chicken or turkey; or beef including various beef parts/organs such as liver or hearts.

In many embodiments, the body has an elongated shape, with an aspect ratio of 2-6.

The body can be made of a variety of materials, including polymeric material or laminated plastics or foil.

In an example embodiment, the spoon includes a flap having a concave surface. The flap is folded against the body in the storage configuration and unfolded and extending from the body in the dispensing configuration.

When the flap is in the storage configuration, it is removably attached to the body.

An adhesive member can be provided to removabaly attach the flap to the body.

A removable tab can be provided attaching the flap to the body.

When the flap is in the storage configuration, the flap covers the mouth, and when the flap is in the dispensing configuration, the flap exposes the mouth.

In another embodiment, there is a hollow fitment secured to the mouth, and the spoon is non-removably secured to the fitment.

There can further include a cap removably covering the spoon, such that when the spoon is covered by the cap, the spoon is in the storage configuration, and when the cap is removed, the spoon is in the dispensing configuration. The cap can be removably attachable to the fitment.

The cap is attachable to the fitment by one of a screw/threaded connection or a snap-fit connection.

The spoon can comprise a rigid molded plastic.

In another embodiment, the storage configuration of the spoon is against the body and within the outer perimeter of the body. The dispensing configuration of the spoon is outside of the outer perimeter of the body.

The spoon can be foldable between the storage configuration and the dispensing configuration, in one example.

In another example, the spoon is slidable between the storage configuration and the dispensing configuration.

In another aspect, a method of dispensing a squeezable animal treat is provided. The method includes providing a pouch body containing a non-solid foodstuff suitable for animal consumption. The body includes a mouth in communication with the interior volume and a spoon integral and non-removably secured to the body. The method includes a step of putting the spoon into a dispensing configuration. The method further includes a step of squeezing the pouch body to dispense the foodstuff from within the pouch body onto the spoon.

In one example, the step of putting the spoon into a dispensing configuration includes unfolding a flap having a concave surface from against the body.

In another example, the step of putting the spoon into a dispensing configuration includes one of an adhesive member or removable tab to release the flap from the body.

In another embodiment, the step of putting the spoon into a dispensing configuration includes removing a cap covering the spoon.

The step of removing the cap can include one of unscrewing the cap or unsnapping the cap.

The step of putting the spoon into a dispensing configuration can include unfolding the spoon from the pouch body.

The step of putting the spoon into a dispensing configuration can includes sliding the spoon from against the pouch body.

The step of providing a pouch body can included providing the pouch body having a non-solid foodstuff comprising any one or combination of a puree, mash, mush, paste, liquid, sauce, broth, chowder, stew, gravy, juice, or bisque.

The method can include having a non-solid foodstuff that is any one or combination of seafood including tuna or salmon; poultry including chicken or turkey; or beef including organs such as liver or hearts.

A variety of examples of desirable features or methods are set forth in the description that follows.

BRIEF DESCRIPTION OF THE DRAWINGS

FIG. 3 is a perspective view of the squeezable pouch of FIG. 1;

FIG. 4 is a perspective view of a rear side of the pouch of FIG. 3, while in a storage position, in according to one embodiment;

FIG. 5 is a perspective view of a rear of the pouch of FIG. 3 in a storage position according to another embodiment;

DETAILED DESCRIPTION

Figure 1:
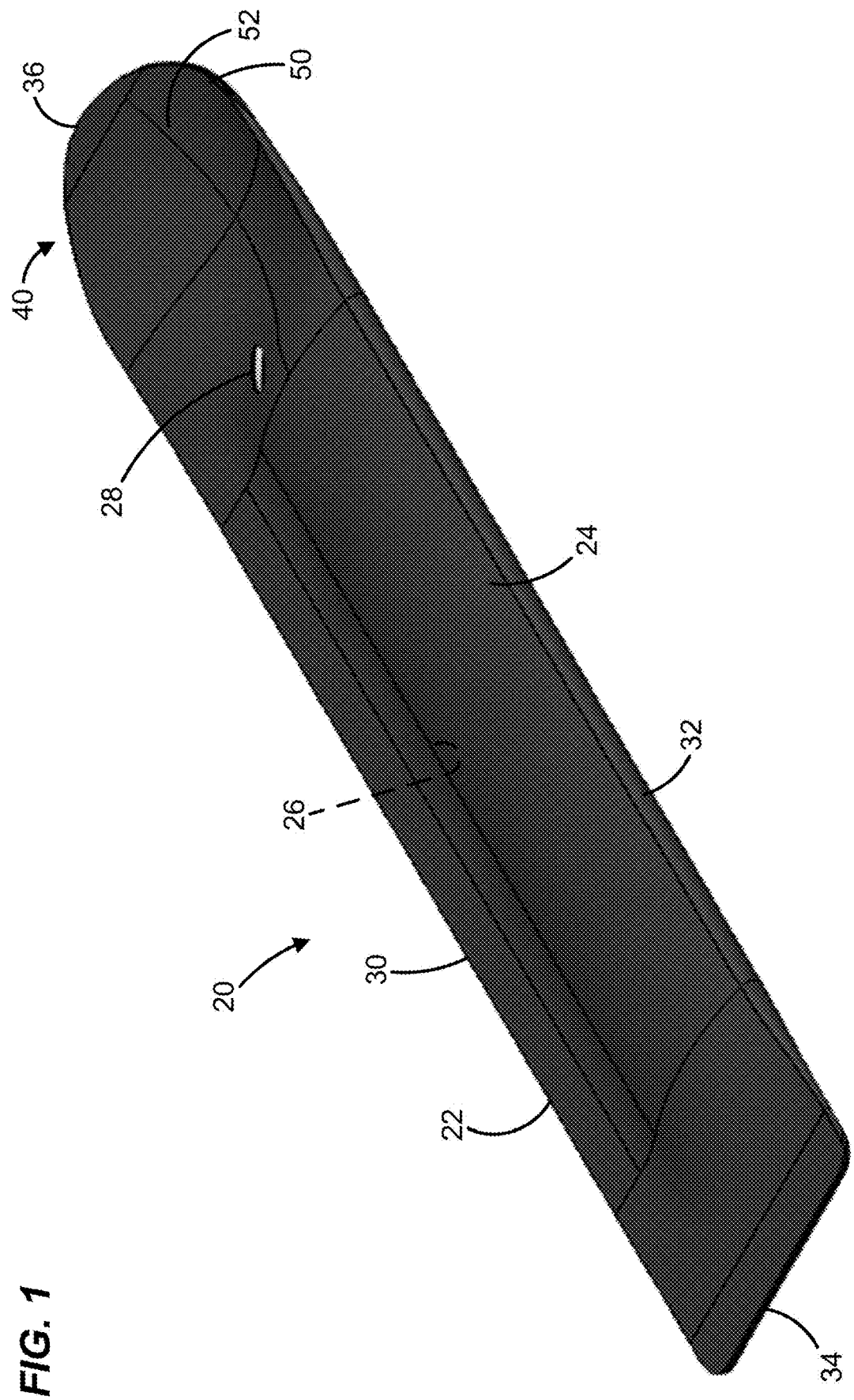
FIG. 1 is a perspective view of a first embodiment of a squeezable pouch, constructed in accordance with principles of this disclosure.
Figure 2:
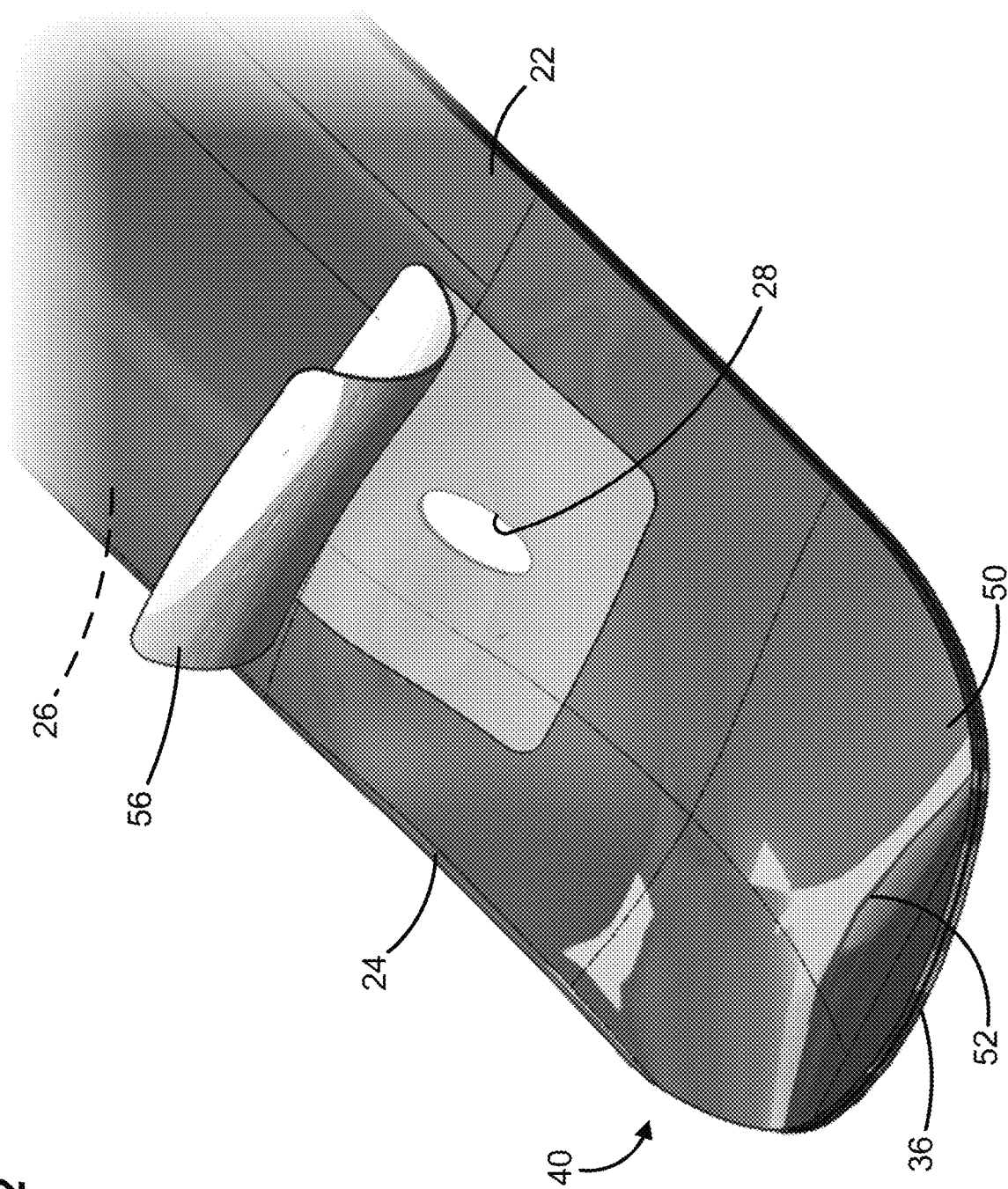
FIG. 2 is a perspective view of an enlarged portion of the squeezable pouch of FIG. 1.

Described herein is an easy squeeze and serve pouch that is a mess-free method of feeding liquid or soft or moist pet food or treats. The pouch described herein contains an integral spoon, and the food/treat can easily squeeze out of the pouch and onto the spoon, where the pet can lick the food/treat for easy consumption. The packaging can then be re-sealed by an easy pull tab and stored for future use.

In reference now to FIGS. 1-10, the pouch is shown generally at 20. The pouch 20 includes a pouch body 22. The pouch body is made from a flexible, squeezable surrounding wall 24 defining an interior volume 26. The wall 24 can be made from a variety of materials including flexible materials such as a flexible plastic or a flexible polymeric material. The materials can also be a variety of laminated plastics, or a foil material.

The body 22 includes a mouth 28. The mouth defines a through hole in communication with the interior volume 26. In use, the treat or food dispensed from the pouch 22 will be squeezed from the interior volume 26 through the mouth 28.

The interior volume 26 of the pouch 20 is sized to hold no more than about 8 ounces of material, such as a non-solid food for animals. In one example, the volume is sized to hold about 1-6 ounces. In other embodiments, it is sized to hold about 1-4 ounces.

As can be seen in the example in FIG. 1, the pouch 20 has a pair of side edges 30, 32 joined by a bottom edge 34. Opposite the bottom edge 34 is a dispensing end 36. In general, the bottom edge 34 defines the width, while the side edges 30, 32 define the length. The mouth 28 is adjacent the dispensing end 36.

The body 20 is sized such that it can be easily held within a typical human hand. In many examples, the body 22 is elongated and has an aspect ratio of length to width between 2 and 6, inclusive. That is, the length can be anywhere from twice the width to six times the width. There are many other examples.

In general, the pouch 20 further includes a spoon 40. The spoon 40 is integral and non-removably secured to the body 22. As explained in further detail below, the spoon 40 has a storage configuration and a dispensing configuration. The spoon 40 is adjacent to the mouth 28 in the body 22. This arrangement is to allow for convenient and non-messy dispensing of the material in the interior volume through the mouth 28 and onto the spoon 40.

The pouch 20 will include a non-solid foodstuff 44 (FIG. 6) suitable for animal consumption in the interior volume 26. The foodstuff 44 may comprise a variety of materials including any one or combination of a puree, mash, mush, paste, liquid, sauce, broth, chowder, stew, gravy, juice, or bisque. The foodstuff 44 can be a variety of meats, vegetables, grains, or other foods including seafood, such as tuna or salmon; poultry such as chicken or turkey; or beef, and including organs such as liver or hearts. A variety of other foods, flavors, or combinations is possible.

In reference now to the embodiment of FIGS. 1-5, the spoon 40 is embodied as a lip or flap 50 having a concave surface 52. The flap 50 can be made from the same material as the body 22 or can include additional laminates or other materials, such as foil.

The flap 50 is folded against the body 22 in the storage configuration (FIGS. 4 and 5) and unfolded along a fold line 54 to extend from the body 22 in the dispensing configuration. The fold line 54 can be, in some examples, generally parallel to the bottom edge 34 and/or generally perpendicular to the side edges 30, 32.

The flap 50, in the storage configuration, is removably attached to the body 22. For example, there can be an adhesive member 56 (FIG. 2) or tape 58 (FIG. 4) removably attaching the flap 50 to the body 22.

There can also be a tab, such as a type of adhesive tab 60 (FIG. 5) attaching the flap 50 to the body 22.

When the flap 50 is in the storage configuration, the flap covers the mouth 28. When the flap 50 is in the dispensing configuration, the flap 50 exposes the mouth 28.

After squeezing the foodstuff 44 (pet food/treat) from the interior 26, through the mouth 28 and onto the spoon 40, the spoon 40 can be returned to the storage position by folding the flap 50 along the fold line 54 and resecuring the flap 50 to the body 22 using the adhesive member 56, including the tape 58 or tab 60.

Figure 6:
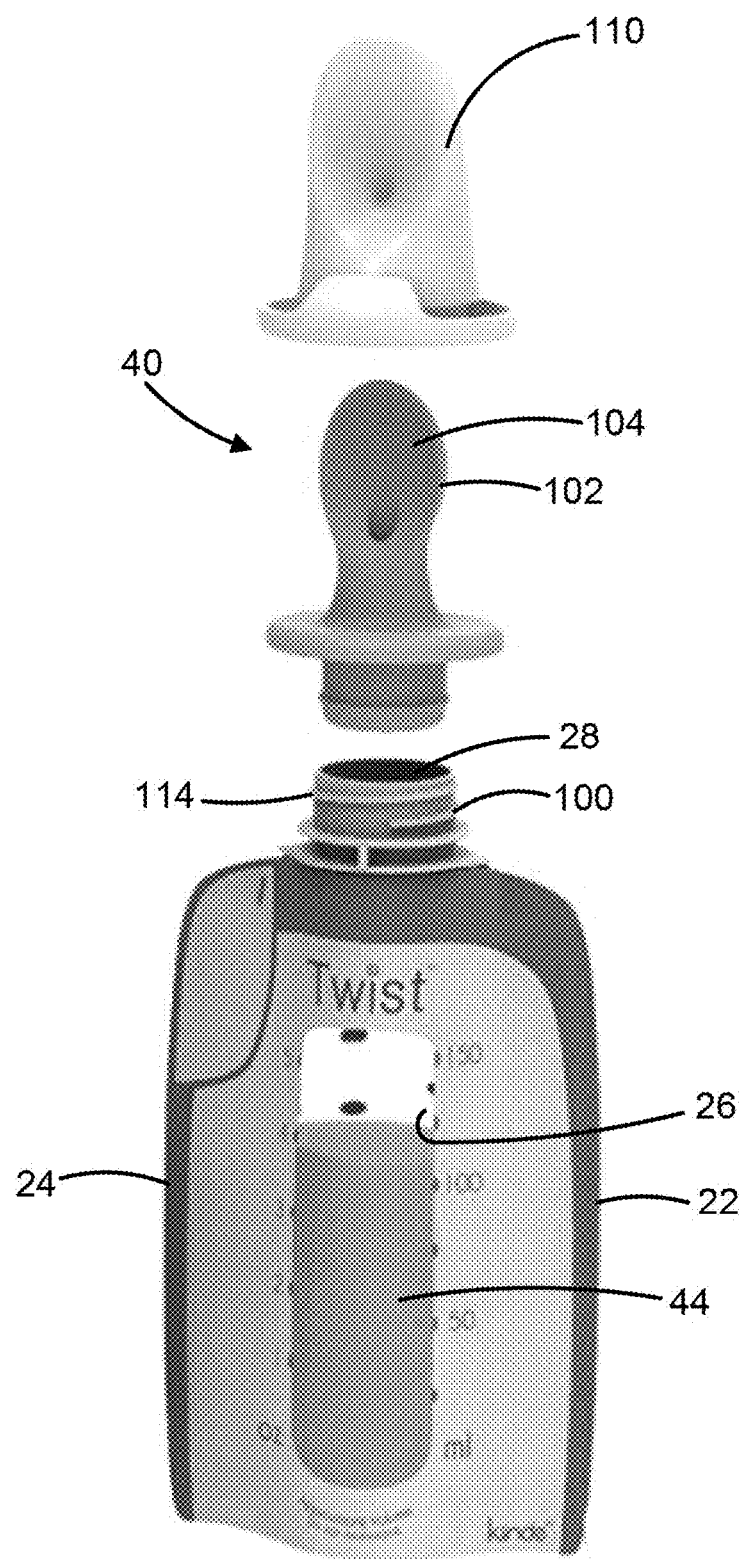
FIG. 6 is an exploded perspective view of another embodiment of a squeezable pouch made in accordance with principles of this disclosure.

In reference now to the embodiment of FIG. 6, the pouch 20 in this embodiment further includes a hollow fitment 100. The fitment 100 is secured to the mouth 28, and the spoon 40 is non-removably secured to the fitment 100.

The spoon 40, in this embodiment, comprises a rigid molded plastic spoon 102 that is non-removably secured to the fitment 100. A base of the spoon 102 can have an opening in communication with the fitment 100. In this manner, the foodstuff 44 from the interior volume 26 can be squeezed through the mouth 28 through the hollow portion of the fitment 100, through the opening in the spoon 102 and onto the concave spoon surface 104 of the spoon 102.

In this embodiment, there is also a cap 110. The cap 110 is removably covering the spoon 102, such that when the spoon 102 is covered by the cap 110, the spoon 102 is in the storage position, and when the cap 110 is removed, the spoon 102 is in the dispensing configuration. The cap 110 can be remoavably attachable to the fitment 100.

For example, the fitment 100 can include threads 114. The threads 114 provide a screw connection between the cap 110 and the fitment 100. In other embodiments, there can be a snap-fit connection between the cap 110 and the fitment 100.

In reference now to the embodiment of FIGS. 7-10, the pouch 20 has spoon 202 that is against the body 22 and within an outer perimeter 208 of the body 22 while in the storage configuration. See FIGS. 8 and 10. The outer perimeter 208 is defined by the side edges 30, 32; bottom edge 34; and dispensing end 36.

Figure 7:
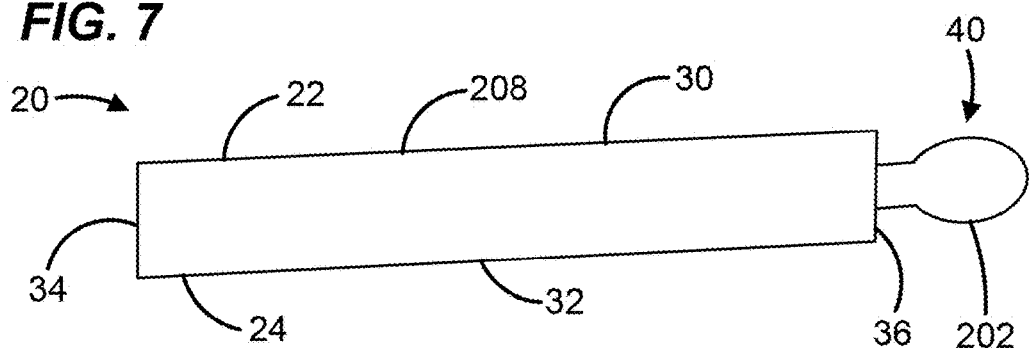
FIG. 7 is a perspective view of another embodiment of a squeezable pouch constructed in accordance with principles of this disclosure.
Figure 9:
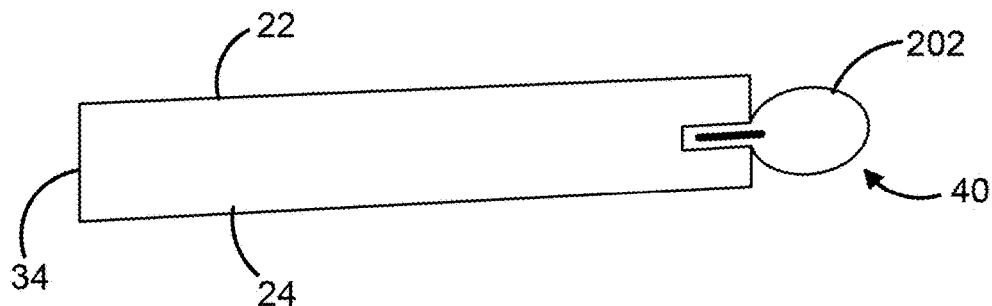
FIG. 9 is a perspective view of the pouch of FIG. 8, but in a dispensing position.

In the dispensing configuration, the spoon 202 is outside of the perimeter 208 of the body 20, as can be seen in FIGS. 7 and 9.

Figure 8:
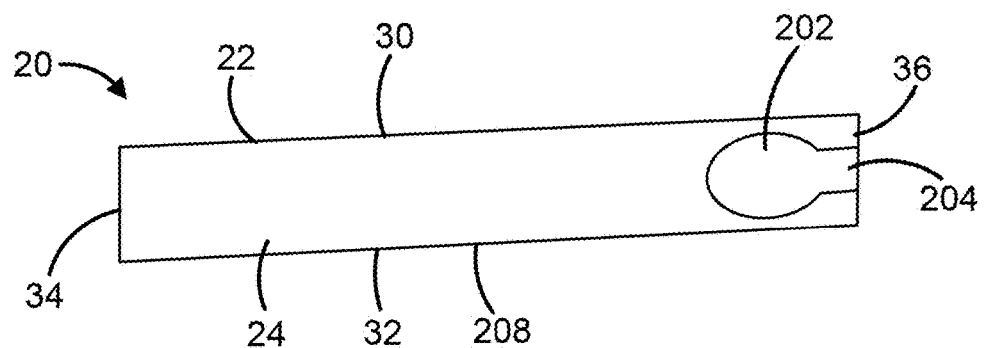
FIG. 8 is a perspective view of a rear side of the pouch of FIG. 7, in a storage position, according to one embodiment.

In FIGS. 8 and 9, the spoon 202 is foldable along a fold line 204 between the storage configuration (FIG. 8) and the dispensing configuration (FIG. 9). The fold line 204 is generally parallel to the bottom edge 34 and/or perpendicular to the side edges 30, 32.

Figure 10:
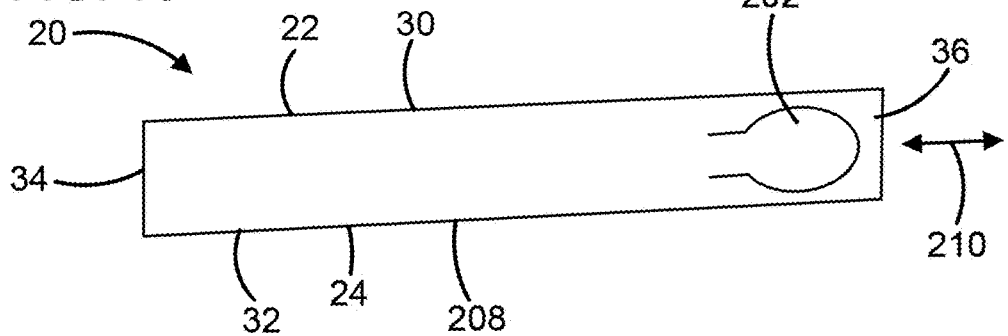
FIG. 10 is a perspective view of a rear of the pouch of FIG. 7 in a storage position according to another embodiment.

In FIG. 10, the spoon 202 is slidable in a direction 210 between the storage configuration (FIG. 10) and the dispensing configuration (FIG. 7). The direction 210 is along the same direction as a longitudinal axis of the pouch 20, along the same lines that the side edges 30, 32 extend.

The above embodiments can be used in a method of dispensing a squeezable animal food/treat. The method includes providing a pouch body containing a non-solid foodstuff suitable for animal consumption. The body includes a mouth in communication with the interior volume and a spoon integral and non-removably secured to the body. Examples of the pouch body include the pouch body 22 as shown in the various configurations of FIGS. 1-10.

The method includes putting the spoon into a dispensing configuration. Examples include putting the spoon 40, 102, 202 into the dispensing configuration as shown in, for example, FIGS. 2, 3, 6, 7, and 9.

The method further includes a step of squeezing the pouch body to dispense the foodstuff within the pouch body and onto the spoon.

The step of putting the spoon into a dispensing configuration includes, for example, unfolding flap 50 having concave surface 52 from against the body 22.

The step of putting the spoon into a dispensing configuration can include removing an adhesive member 56, tape 58, or tab 60 to release the flap 50 from the body 22.

The step of putting the spoon into a dispensing configuration can include removing the cap 110 from covering the spoon 102. The step of removing the cap 110 includes one of unscrewing or unsnapping the cap 110.

The step of putting the spoon into a dispensing configuration can include unfolding the spoon from against the pouch body 22, along the fold line 204.

The step of putting the spoon into a dispensing configuration can include sliding the spoon 202 from against the pouch body 22.

The step of providing the pouch body 22 includes providing a non-solid foodstuff comprising any one or combination of puree, mash, mush, paste, liquid, sauce, broth, chowder, stew, gravy, juice, or bisque.

The non-solid foodstuff can be meats, vegetables, fruits, or grains including: seafood such as tuna or salmon; poultry such as chicken or turkey; or beef including organs such as liver or heart; or any combination.

The method can further include, after dispensing the foodstuff, putting the spoon into a storage position. Putting the spoon into the storage position can include folding the spoon back against the body 22 or sliding the spoon back against the body 22.

The above represents example principles. Many embodiments can be made using these principles.

What is claimed is:

1. A pouch for dispensing a squeezable animal treat; the pouch comprising:
   (a) a pouch body including a flexible, squeezable surrounding wall defining an interior volume having a bottom edge and side edges extending from the bottom edge; the body including a mouth defining a through hole in a face of the wall and in communication with the interior volume; the interior volume being sized to hold no more than 8 ounces of material;
   (b) a spoon integral and non-removably secured to the body and spaced from the through hole; the spoon being a flap having a concave surface;
      (i) the flap being made from a same material as the body;
      (ii) the flap being foldable against the body and unfoldable along a fold line to extend from the body;
      (iii) the fold line being parallel to the bottom edge and perpendicular to the side edges of the body;
      (iv) the flap maintaining its concave surface configuration in both folded and unfolded positions;
   (c) an adhesive cover on the body, removably covering the through hole of the mouth.

2. The pouch of claim 1 wherein:
   (a) the spoon has a storage configuration and a dispensing configuration; and
   (b) the spoon is adjacent the mouth in the body.

3. The pouch of claim 2 wherein the storage configuration of the spoon is against the body and within an outer perimeter of the body, wherein the dispensing configuration of the spoon is outside of the outer perimeter of the body.

4. The pouch of claim 2, wherein flap is folded against the body in a storage configuration, and unfolded and extending from the body in a dispensing configuration.

5. The pouch of claim 4 wherein the flap, in the storage configuration, is removably attached to the body.

6. The pouch of claim 4, wherein:
   (a) when the flap is in the storage configuration, the flap covers the mouth; and
   (b) when the flap is in the dispensing configuration, the flap exposes the mouth.

7. The pouch of claim 1 further comprising:
   a non-solid foodstuff suitable for animal consumption in the interior volume, wherein the non-solid foodstuff comprises any one of a puree, mash, mush, paste, liquid, sauce, broth, chowder, stew, gravy, juice, or bisque.

8. The pouch of claim 1 wherein the body comprises a polymeric material.

9. The pouch of claim 1, wherein the interior volume is sized to hold 1-6 ounces of material.

10. The pouch of claim 1, wherein the body is elongated having an aspect ratio of 2-6.

11. A method of dispensing a squeezable animal treat from a pouch of claim 1; the method comprising:
    (a) providing the pouch body containing a non-solid foodstuff suitable for animal consumption;
    (b) removing the cover to expose the through hole of the mouth and putting the spoon into a dispensing configuration; and
    (c) squeezing the pouch body to dispense the foodstuff from within the pouch body through the through hole and onto the spoon.

12. The method of claim 11 wherein the step of putting the spoon into a dispensing configuration includes unfolding the spoon from against the pouch body.

13. The method of claim 11 wherein the step of providing the pouch body includes providing the pouch body having the non-solid foodstuff comprising any one of a puree, mash, mush, paste, liquid, sauce, broth, chowder, stew, gravy, juice, or bisque.

14. The method of claim 13, wherein the non-solid foodstuff is any one of tuna flavored, seafood flavored, poultry flavored, or beef flavored.

* * * * *